United States Patent
Bachmann et al.

(10) Patent No.: US 11,846,342 B2
(45) Date of Patent: Dec. 19, 2023

(54) SIX-SPEED FRONT-TRANSVERSE DOUBLE-CLUTCH TRANSMISSION WITH THIRD COUNTER SHAFT

(71) Applicant: ZF Friedrichshafen AG, Friedrichshafen (DE)

(72) Inventors: Max Bachmann, Friedrichshafen (DE); Thomas Rosemeier, Meckenbeuren (DE); Michael Roske, Friedrichshafen (DE); Matthias Reisch, Ravensburg (DE); Johannes Kaltenbach, Friedrichshafen (DE); Stefan Beck, Eriskirch (DE); Michael Wechs, Weißensberg (DE); Martin Rattay, Ravensburg (DE); Juri Pawlakowitsch, Kressbronn (DE); Fabian Kutter, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 67 days.

(21) Appl. No.: 17/413,254

(22) PCT Filed: Nov. 15, 2019

(86) PCT No.: PCT/EP2019/081421
§ 371 (c)(1),
(2) Date: Jun. 11, 2021

(87) PCT Pub. No.: WO2020/120066
PCT Pub. Date: Jun. 18, 2020

(65) Prior Publication Data
US 2022/0042578 A1 Feb. 10, 2022

(30) Foreign Application Priority Data
Dec. 14, 2018 (DE) ...................... 10 2018 221 844.7

(51) Int. Cl.
*F16H 3/00* (2006.01)
*F16H 3/093* (2006.01)
*F16H 3/08* (2006.01)

(52) U.S. Cl.
CPC ............. *F16H 3/093* (2013.01); *F16H 3/006* (2013.01); *F16H 2003/0822* (2013.01);
(Continued)

(58) Field of Classification Search
CPC .. F16H 3/093; F16H 3/006; F16H 2003/0826; F16H 2003/0822;
(Continued)

(56) References Cited

U.S. PATENT DOCUMENTS 8,739,644 B2 6/2014 Singh et al.
9,341,239 B2 * 5/2016 Lee ......................... F16H 3/006
(Continued)

FOREIGN PATENT DOCUMENTS

DE 10225331 A1 12/2003
DE 102012213450 A1 2/2013
(Continued)

OTHER PUBLICATIONS

International Search Report (English Translation) PCT/EP2019/081421, dated Jan. 17, 2020. (2 pages).
(Continued)

*Primary Examiner* — Ha Dinh Ho
(74) *Attorney, Agent, or Firm* — Dority & Manning, P.A.

(57) ABSTRACT

A transmission where a first shaft is rotationally fixable to a third shaft and to a second shaft, the second and third shafts are rotationally connectable to a fourth shaft, the second shaft is rotationally connectable to a fifth shaft, the fourth shaft is rotationally connectable to the fifth shaft, the third shaft is rotationally connectable to the fifth shaft, fixed gears of the fourth and fifth shafts are rotationally connected to a
(Continued)

drive output, a first gearwheel of the sixth shaft meshes with a fixed gear of the second shaft, and a second gearwheel of the sixth shaft meshes with a fixed gear of the third shaft. Moreover, a first gearwheel of the sixth shaft is an idler gear and a second gearwheel of the sixth shaft is a fixed gear, or vice versa. Additionally, the idler gear of the sixth shaft is rotationally fixable to the sixth shaft.

5 Claims, 3 Drawing Sheets

(52) U.S. Cl.
CPC ............... *F16H 2003/0826* (2013.01); *F16H 2200/0056* (2013.01); *F16H 2200/0086* (2013.01); *F16H 2200/2035* (2013.01)

(58) Field of Classification Search
CPC ..... F16H 2200/0056; F16H 2200/0086; F16H 2200/2035
USPC .................................................... 74/330, 331
See application file for complete search history.

(56) References Cited

U.S. PATENT DOCUMENTS

| | | | | |
|---|---|---|---|---|
| 9,889,733 B2* | 2/2018 | Yang | ................. | B60K 6/38 |
| 10,166,853 B2* | 1/2019 | Yang | ................. | B60K 6/448 |
| 10,166,973 B2* | 1/2019 | Yang | ................. | B60W 20/30 |
| 11,105,399 B2* | 8/2021 | Eo | ................. | F16H 3/006 |
| 2007/0199393 A1 | 8/2007 | Hattori | | |
| 2007/0266810 A1* | 11/2007 | Forsyth | ................. | F16H 3/006 74/331 |
| 2016/0084351 A1* | 3/2016 | Lee | ................. | F16H 3/093 74/330 |
| 2016/0298733 A1* | 10/2016 | Bender | ................. | F16H 3/093 |

FOREIGN PATENT DOCUMENTS

| | | |
|---|---|---|
| DE | 102014213459 A1 | 1/2016 |
| DE | 102014118213 A1 | 3/2016 |
| DE | 102017102348 A1 | 8/2018 |
| EP | 1826457 A2 | 8/2007 |
| WO | WO 2018/145882 | 8/2018 |

OTHER PUBLICATIONS

German Search Report 102018221844.7, dated Jul. 30, 2019. (12 pages).
EP Office Action 19 805 628.5-1012, dated Jun. 22, 2022. (5 pages).

* cited by examiner

SIX-SPEED FRONT-TRANSVERSE DOUBLE-CLUTCH TRANSMISSION WITH THIRD COUNTER SHAFT

CROSS-REFERENCE TO RELATED APPLICATION

The present application is related and has right of priority to German Patent Application No. 10 2018 221 844.7 filed on Dec. 14, 2018 and is a nationalization of PCT/EP2019/081421 filed in the European Patent Office on Nov. 15, 2019, both of which are incorporated by reference in their entirety for all purposes.

FIELD OF THE INVENTION

The invention relates to a transmission, more particularly, to a six-speed, front-transverse double-clutch transmission with a third counter shaft.

BACKGROUND

Publication DE 10 2012 213 450 A1 discloses a dual-clutch transmission with a third countershaft. The third countershaft has an idler gear, a fixed gear, and a shift element. The idler gear is connectable to the countershaft in a rotationally fixed manner via the shift element. The fixed gear and the idler gear are both rotationally connectable or connected to one of the two other countershafts. A rotational connection between the two further countershafts is established by engaging the shift element of the third countershaft.

In addition, dual-clutch transmissions having two countershafts are known from the prior art, with the aid of which six forward gears are implementable.

The problem being addressed herein is that of making a transmission available, which does not have the disadvantages inherent in the approaches known from the prior art. In particular, the installation space requirement of the transmission is to be reduced in the axial direction when compared to prior art transmissions.

SUMMARY OF THE INVENTION

This problem is solved by a transmission having at least six shafts, preferably precisely six shafts—including a first shaft, a second shaft, a third shaft, a fourth shaft, a fifth shaft, and a sixth shaft. One shaft is a machine element for transmitting turning motions and torques between parts connected thereto, i.e., rotating therewith.

The first shaft, the second shaft, and the third shaft are preferably arranged coaxially to one another. This means they have identical or coaxial axes of rotation. The fourth shaft and the fifth shaft are preferably arranged axially offset with respect to the first, second, and third shafts. In addition, the fourth shaft and the fifth shaft are preferably arranged axially offset with respect to one another. The axis of rotation of the first, second, and third shafts, the axis of rotation of the fourth shaft, and the axis of rotation of the fifth shaft are therefore different from one another and extend spaced apart from one another. In addition, the sixth shaft is preferably arranged axially offset with respect to the first shaft, the second shaft, the third shaft, the fourth shaft, and the fifth shaft. An axis of rotation of the sixth shaft therefore differs from and extends spaced apart from the axis of rotation of the first, second, and third shafts, from the axis of rotation of the fourth shaft, and from the axis of rotation of the fifth shaft.

The second shaft is a hollow shaft, through which the third shaft extends. Alternatively, the third shaft is a hollow shaft, through which the second shaft extends.

The first shaft is preferably connected in a rotational or rotationally fixed manner to an internal combustion engine or to a crankshaft of the internal combustion engine. Correspondingly, the transmission is suitable for use in a motor vehicle, in particular in a front-mounted transverse arrangement.

Two components, for example, two shafts or one gearwheel and one shaft, are connected to each other in a rotationally fixed manner such that there is no rotational degree of freedom between the components. Rotationally fixed components are therefore not displaceable in relation to one another.

The fourth shaft, the fifth shaft, and the sixth shaft are countershafts. One countershaft is a shaft that is arranged axially offset with respect to an input shaft—the second shaft or the third shaft—and a drive output, and via which a torque flow of at least one gear extending from the input shaft to the drive output is directed.

In addition, the transmission has at least nine shift elements, preferably precisely nine shift elements—including a first shift element, a second shift element, a third shift element, a fourth shift element, a fifth shift element, a sixth shift element, a seventh shift element, an eighth shift element, and a ninth shift element. One shift element is for operably connecting, in a rotationally fixed manner, two components that are rotatable in relation to one another, for example, a gearwheel and a shaft or two shafts. The shift element has an engaged condition and a disengaged condition. In the disengaged condition, the components are rotatable in relation to one another. If the shift element is in the engaged condition, it connects the components to one another in a rotationally fixed manner. The shift element is selectively actuatable. This means the shift element is transferrable, at any point in time, via actuation, from the disengaged condition into the engaged condition and from the engaged condition into the disengaged condition.

The first shaft and the third shaft are connectable to each other in a rotationally fixed manner via the first shift element. The first shaft and the second shaft are connectable to each other in a rotationally fixed manner via the second shift element. The first shift element and the second shift element are preferably friction-locking shift elements, in order to be utilized as launch clutches. In particular, the first shift element and the second shift element are integrated in a shared housing. The housing, the first shift element, and the second shift element form a dual clutch.

An equidirectional coupling of two components exists when the two components have the same direction of rotation. If the components rotate in opposite directions, they are heterodirectionally coupled.

The second shaft and the fourth shaft are rotationally, preferably heterodirectionally, connectable to each other via the third shift element. Similarly, the third shaft and the fourth shaft are rotationally, preferably heterodirectionally, connectable to each other via the fifth shift element. The second shaft and the fifth shaft are rotationally, preferably heterodirectionally, connectable to each other via the sixth shift element. The fourth shaft and the fifth shaft are rotationally, preferably heterodirectionally, connectable to each other via the seventh shift element. Finally, the third shaft and the fifth shaft are rotationally, preferably heterodirectionally, connectable to each other via the eighth shift element.

Two components are rotationally connected to each other when they are coupled such that they have one degree of freedom. A general definition of the term "degree of freedom" is provided in "Dubbel" (Karl-Heinrich Grothe, Jörg Feldhusen: "Dubbel". 22nd edition, 2007). There is a reversibly univocal relationship between the rotational speeds of the components that are rotationally connected to each other. Due to a rotational speed of a first component, a rotational speed of a second component is unambiguously established. Conversely, due to the rotational speed of the second component, the rotational speed of the first component is unambiguously established. In particular, a linear rotational-speed relationship can exist between the components. A ratio between the two components can be greater than or less than 1.

If a first component and a second component are rotationally connectable to each other via a shift element, there is a rotational connection between the first component and a third component and/or a rotational connection between the second component and a fourth component. Via the shift element, the third component and the fourth component are connectable to each other in a rotationally fixed manner, the first component and the fourth component are connectable to each other in a rotationally fixed manner, or the second component and the third component are connectable to each other in a rotationally fixed manner.

Finally, the transmission has a drive output. The drive output is, for example, an output shaft having a fixed gear or an axle differential.

A fixed gear of the fourth shaft is rotationally connected to the drive output. Similarly, a fixed gear of the fifth shaft is rotationally connected to the drive output.

A fixed gear of a shaft is a gearwheel that is fixed on the shaft in a rotationally fixed manner. Preferably, the gearwheel is rigidly fixed on the shaft, so no relative movements are possible between the shaft and the fixed gear and the fixed gear rotates with the shaft about a shared axis of rotation.

An idler gear of a shaft is a gearwheel that is rotatably mounted on the shaft. The shaft and the idler gear are rotatable in relation to one another. An axis of rotation of the gearwheel and an axis of rotation of the shaft are identical in this case. Preferably, the shaft extends through the idler gear.

According to the invention, a first gearwheel of the sixth shaft and a fixed gear of the second shaft mesh with one another and a second gearwheel of the sixth shaft and a fixed gear of the third shaft mesh with one another. The first gearwheel of the sixth shaft is an idler gear, while the second gearwheel of the sixth shaft is a fixed gear. Alternatively, the first gearwheel of the sixth shaft is the fixed gear, while the second gearwheel of the sixth shaft is the idler gear.

The idler gear of the sixth shaft and the sixth shaft are connectable to each other in a rotationally fixed manner via the ninth shift element. In this way, an additional gear is implemented, the torque flow of which, starting from the first shaft, extends via the second shaft to the sixth shaft, via the sixth shaft to the first shaft and, further, via the fourth shaft to the drive output. Although the sixth shaft takes up installation space in the radial direction, the dimensions of the transmission remain unchanged in the axial direction. The transmission according to the invention is therefore implemented in a manner that is particularly installation space-saving in the axial direction. The transmission is therefore particularly suitable for use in a motor vehicle in a front-mounted transverse arrangement.

The transmission is preferably refined such that a fixed gear of the second shaft and the first gearwheel of the sixth shaft mesh with one another, and the fixed gear of the second shaft is rotationally connected to a first idler gear of the fourth shaft and to a first idler gear of the fifth shaft. The first idler gear of the fourth shaft and the fourth shaft are connectable to each other in a rotationally fixed manner via the third shift element. The first idler gear of the fifth shaft and the fifth shaft are connectable to each other in a rotationally fixed manner via the sixth shift element. A first fixed gear of the third shaft and a second idler gear of the fourth shaft are rotationally connected to each other. The second idler gear of the fourth shaft and the fourth shaft are connectable to each other in a rotationally fixed manner via the fourth shift element. The second idler gear of the fourth shaft and a second idler gear of the fifth shaft are rotationally connected to each other. The second idler gear of the fifth shaft and the fifth shaft are rotationally fixable via the seventh shift element. A second fixed gear of the third shaft is rotationally connected to a third idler gear of the fourth shaft and to a third idler gear of the fifth shaft. The third idler gear of the fourth shaft and the fourth shaft are connectable to each other in a rotationally fixed manner via the fifth shift element The third idler gear of the fifth shaft and the fifth shaft are connectable to each other in a rotationally fixed manner via the eighth shift element. The second gearwheel of the sixth shaft meshes with the first fixed gear of the third shaft, with the second fixed gear of the third shaft, or with a third fixed gear of the third shaft.

A method according to the invention for shifting the above-described transmission provides that a first gear ratio or step is implemented by engaging the second shift element, the ninth shift element, and the fourth shift element; wherein a second gear ratio is implemented by engaging the first shift element and the fourth shift element; wherein a third gear ratio is implemented by engaging the second shift element and the sixth shift element; wherein a fourth gear ratio is implemented by engaging the first shift element and the eighth shift element; wherein a fifth gear ratio is implemented by engaging the second shift element and the third shift element; and wherein a sixth gear ratio is implemented by engaging the first shift element and the fifth shift element.

Via the sixth shaft, a first reverse gear ratio can also be implemented, the torque flow of which extends, starting from the first shaft, via the second shaft, from there via the sixth shaft to the third shaft and, from there, via the fourth shaft to the drive output. For this purpose, the second shift element, the fourth shift element, the seventh shift element, and the ninth shift element are engaged.

A second reverse gear ratio is implemented by engaging the first shift element, the fourth shift element, and the seventh shift element.

In addition, it is possible to engage a seventh gear ratio. This is implemented by engaging the first shift element, the ninth shift element, and the third shift element. A torque flow of the seventh gear ratio extends, starting from the first shaft, via the third shaft, from there via the sixth shaft to the second shaft and, from there, via the fourth shaft to the drive output.

The shift elements that do not need to be engaged for the particular gear ratio according to the description, above, are preferably disengaged. A gear ratio is preselected by engaging one or several of the third through ninth shift elements. Due to the fact that, depending on the selected gear ratio, the first shift element is disengaged and the second shift element is engaged or the first shift element is engaged and the second shift element is disengaged, the transmission is changed over into the preselected gear ratio. In this way, it is possible to preselect the second gear ratio when the first gear ratio is engaged. If the second gear ratio is engaged, the first gear ratio, the third gear ratio, or the fifth gear ratio is preselected. If the third gear ratio is engaged, the second reverse gear ratio, the second gear ratio, the fourth gear ratio, or the sixth gear ratio is preselected. If the fourth gear ratio is engaged, the third gear ratio or the fifth gear ratio is preselected. If the fifth gear ratio is engaged, the second reverse gear ratio, the second gear ratio, the fourth gear ratio, the sixth gear ratio, or the seventh gear ratio is preselected. If the sixth gear ratio is engaged, the third gear ratio or the fifth gear ratio is preselected. If the seventh gear ratio is engaged, the fifth gear ratio is preselected. When the first reverse gear ratio is engaged, no other gear ratio is preselectable. If the second reverse gear ratio is engaged, the first reverse gear ratio, the third gear ratio, or the fifth gear ratio is preselected.

BRIEF DESCRIPTION OF THE DRAWINGS

Preferred exemplary embodiments of the invention are represented in the figures. Identical reference characters label identical or functionally identical features. Specifically.

DETAILED DESCRIPTION

Figure 1:
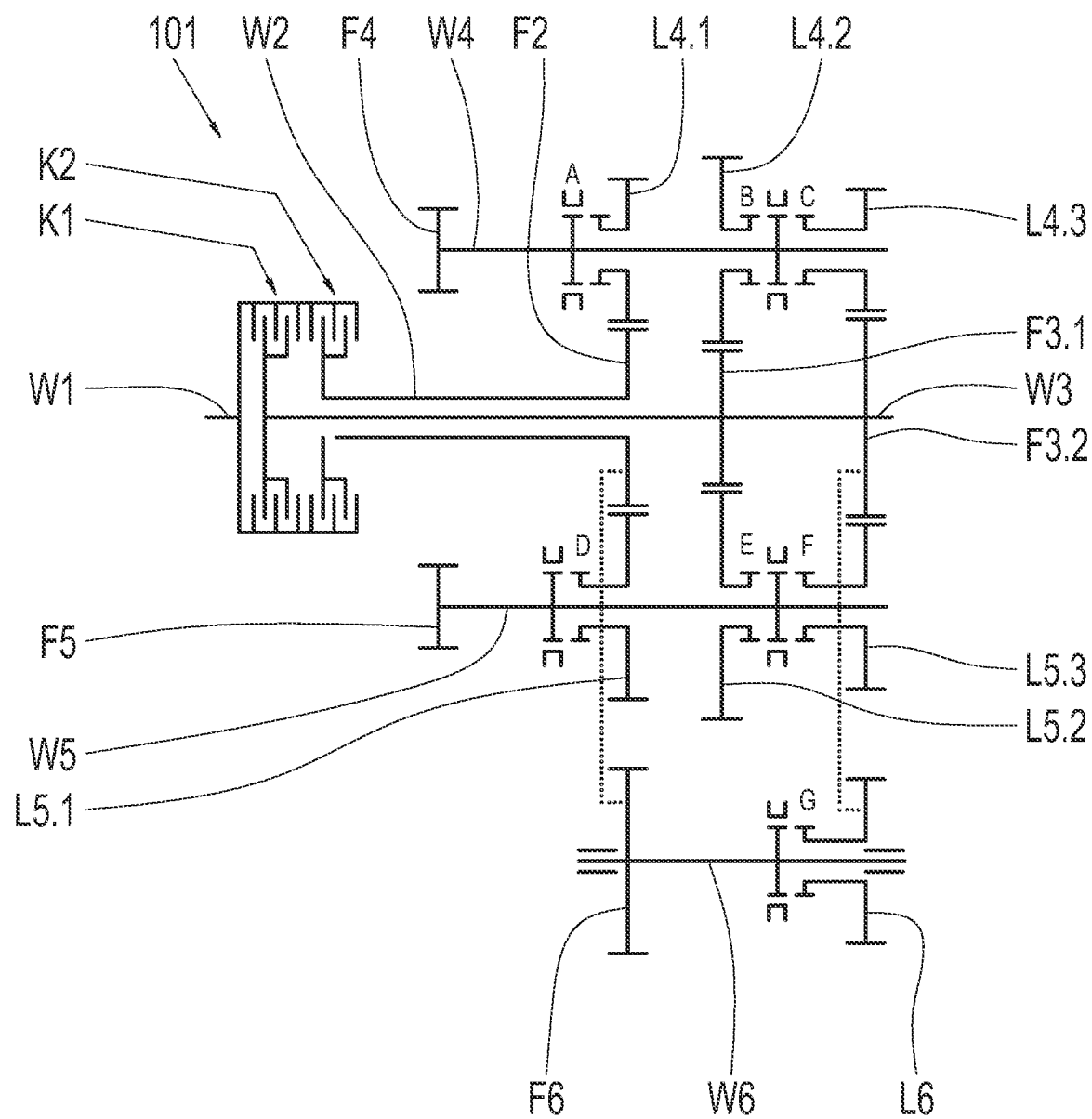
FIG. 1 shows a first example gear set in accordance with aspects of the present subject matter.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

The first gear set 101 represented in FIG. 1 has a total of six shafts, including a first shaft W1, a second shaft W2, a third shaft W3, a fourth shaft W4, a fifth shaft W5, and a sixth shaft W6. The gear set 101 further has nine shift elements, including a first shift element K1, a second shift element K2, a third shift element A, a fourth shift element B, a fifth shift element C, a sixth shift element D, a seventh shift element E, an eighth shift element F, and a ninth shift element G.

The first shaft W1, the second shaft W2, and the third shaft W3 are arranged coaxially to one another. The first shift element K1, in the engaged condition, connects the first shaft W1 and the third shaft W3 to one another in a rotationally fixed manner. The second shift element K2, in the engaged condition, establishes a rotationally fixed connection between the first shaft W1 and the second shaft W2. The second shaft W2 is a hollow shaft, through which the third shaft W3 extends.

The first shift element K1 and the second shift element K2 act as launch clutches and, therefore, are friction-locking. The two shift elements K1, K2 are integrated in a shared housing, as a dual clutch.

The second shaft W2 has a first fixed gear F2.1. The third shaft W3 has a first fixed gear F3.1 and a second fixed gear F3.2. The arrangement of these three fixed gears F2.1, F3.1, F3.2 in the axial direction, which is referred to in the following as the axial reference direction, is as follows: the fixed gear F2 of the second shaft W2, the first fixed gear F3.1 of the third shaft W3, and the second fixed gear F3.2 of the third shaft W3.

The fourth shaft W4 has a fixed gear F4, a first idler gear L4.1, a second idler gear L4.2, and a third idler gear L4.3. The first idler gear L4.1 of the fourth shaft W4 meshes with the fixed gear F2 of the second shaft, the second idler gear L4.2 of the fourth shaft W4 meshes with the first fixed gear F3.1 of the third shaft W3, and the third idler gear L4.3 of the fourth shaft W4 meshes with the second fixed gear F3.2 of the third shaft W3. Appropriately, the fourth shaft W4 is arranged axially offset with respect to the first shaft W1, the second shaft W2, and the third shaft W3. The third shift element A, in the engaged condition, establishes a rotationally fixed connection between the first idler gear L4.1 of the fourth shaft W4 and the fourth shaft W4. Similarly, the fourth shift element B, in the engaged condition, connects the second idler gear L4.2 of the fourth shaft W4 and the fourth shaft W4 to one another with a rotationally fixed connection. A rotationally fixed connection between the third idler gear L4.3 of the fourth shaft W4 and the fourth shaft W4 is established by the fifth shift element C in the engaged condition.

In the axial reference direction, the gearwheels of the fourth shaft W4 are arranged as follows: the fixed gear F4, the first idler gear L4.1, the second idler gear L4.2, and the third idler gear L4.3.

The fifth shaft W5 has a fixed gear F5, a first idler gear L5.1, a second idler gear L5.2, and a third idler gear L5.3. The first idler gear L5.1 of the fifth shaft W5 meshes with the fixed gear F2 of the second shaft W2, the second idler gear L5.2 of the fifth shaft W5 meshes with the first fixed gear F3.1 of the third shaft W3, and the third idler gear L5.3 of the fifth shaft W5 meshes with the second fixed gear F3.2 of the third shaft W3. This yields, with respect to the axial reference direction, the following order of the gearwheels of the fifth shaft W5: the fixed gear F5, the first idler gear L5.1, the second idler gear L5.2, and the third idler gear L5.3. In addition, the fifth shaft W5 is arranged axially offset with respect to the first shaft W1, the second shaft W2, and the third shaft W3. In addition, the fifth shaft W5 and the fourth shaft W4 are arranged axially offset with respect to one another.

In the engaged condition, the sixth shift element D establishes a rotationally fixed connection between the first idler gear L5.1 of the fifth shaft and the fifth shaft. The seventh shift element E, in the engaged condition, establishes a rotationally fixed connection between the second idler gear L5.2 of the fifth shaft W5 and the fifth shaft W5. If the eighth shift element F is in the engaged condition, it establishes a rotationally fixed connection between the third idler gear L5.3 of the fifth shaft W5 and the fifth shaft W5.

The sixth shaft W6 has a fixed gear F6 and an idler gear L6. The fixed gear F6 of the sixth shaft W6 meshes with the fixed gear F2.1 of the second shaft W2. The idler gear L6 of the sixth shaft W6 meshes with the second fixed gear F3.2 of the third shaft W3. Appropriately, the idler gear L6 of the sixth shaft W6 is arranged following the fixed gear F6 of the sixth shaft W6 in the axial reference direction.

Alternative exemplary embodiments are implementable, in which the idler gear L6 of the sixth shaft W6 meshes with the first fixed gear F3.1 of the third shaft W3 or with a third fixed gear of the third shaft W3. It is also possible to interchange the fixed gear F6 of the sixth shaft W6 and the idler gear L6 of the sixth shaft W6, so the idler gear L6 of the sixth shaft W6 meshes with the fixed gear F2 of the second shaft W2, while the fixed gear F6 of the sixth shaft W6 meshes with one of the fixed gears of the third shaft W3. The fixed gear F6 of the sixth shaft W6 is arranged ahead of the idler gear L6 of the sixth shaft W6 in the axial reference direction.

A drive output of the first gear set 101 is not represented in FIG. 1. The fixed gear F4 of the fourth shaft W4 and the fixed gear F5 of the fifth shaft W5 mesh with a tooth system of the drive output.

Figure 2:
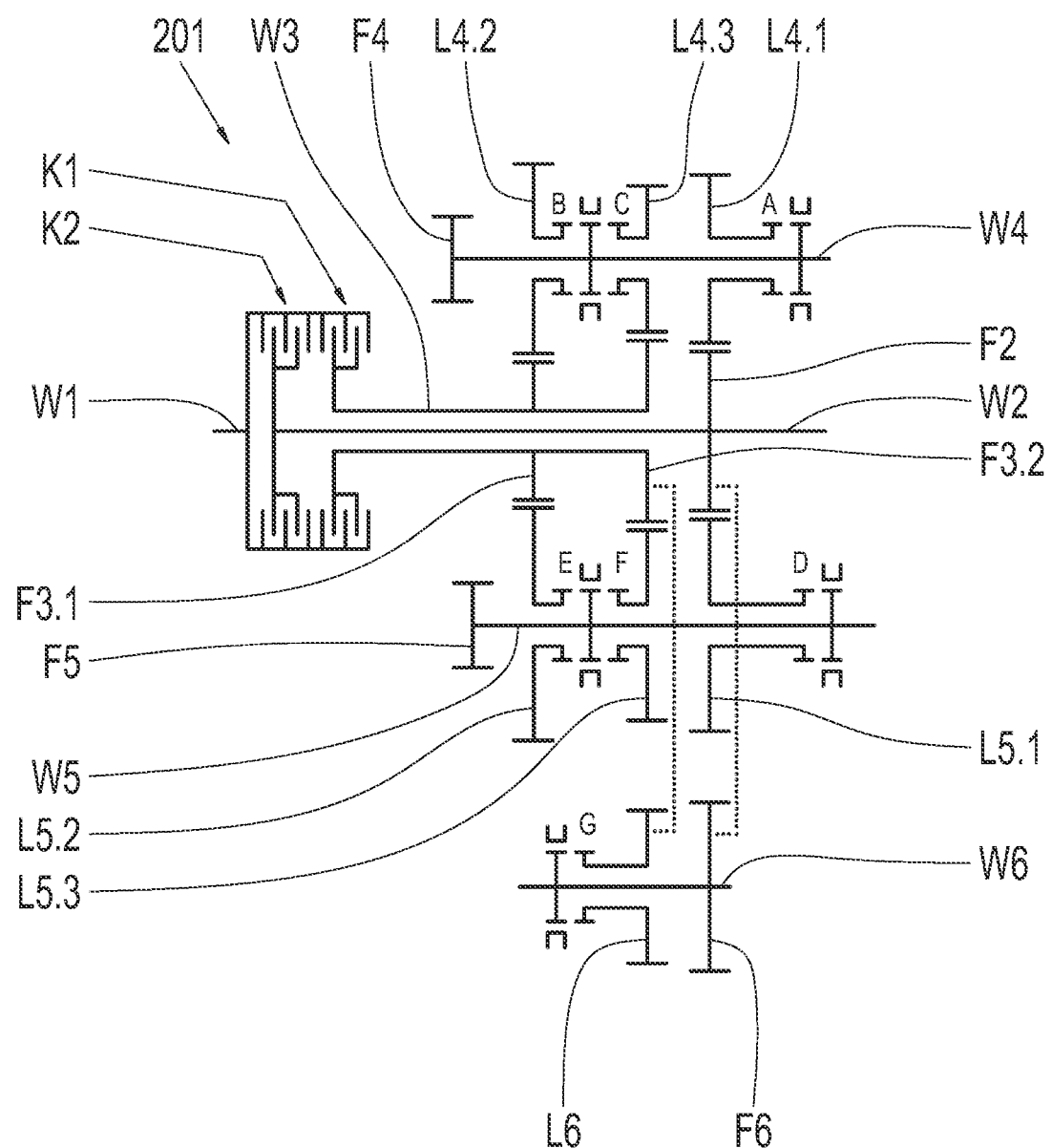
FIG. 2 shows a second example gear set in accordance with aspects of the present subject matter.

The second gear set 201 represented in FIG. 2 has the same components as the first gear set 101. The functional relationships of the individual components are the same. In particular, corresponding gearwheels mesh with one another. The effect of the individual shift elements also remains unchanged. The design and arrangement of the second shaft W2 and of the third shaft W3 were changed in FIG. 2 in comparison to FIG. 1, however. Particularly, the third shaft W3 of the second gear set 201 is a hollow shaft, while the second shaft W2 extends through the third shaft W3. This yields a deviating axial arrangement of the gearwheels. The gearwheels of the second shaft W2 and of the third shaft W3 are arranged, with respect to the axial reference direction, as follows: the first fixed gear F3.1 of the third shaft W3, the second fixed gear F3.2 of the third shaft W3, and the fixed gear F2.1 of the second shaft W2. The gearwheels of the fourth shaft W4 are arranged, with respect to the axial reference direction, as follows: the fixed gear F4, the second idler gear L4.2, the third idler gear L4.3, and the first idler gear L4.1. The gearwheels of the fifth shaft W5 are arranged, with respect to the axial reference direction, as follows: the fixed gear F5, the second idler gear L5.2, the third idler gear L5.3, the first idler gear L5.1. The fixed gear F6 of the sixth shaft W6 is arranged, in the axial reference direction, behind the idler gear L6 of the sixth shaft W6.

Figure 3:
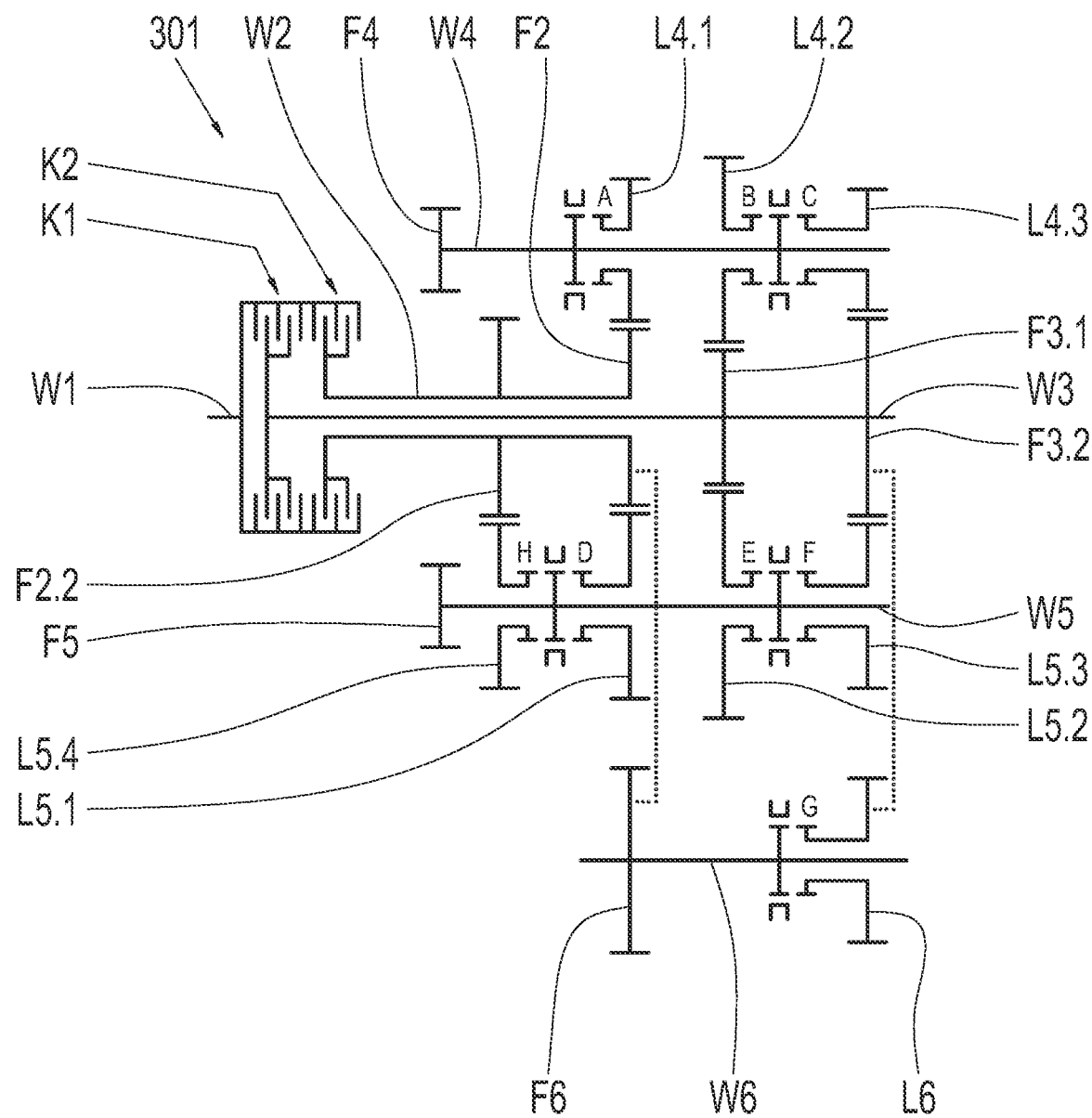
FIG. 3 shows a third example gear set in accordance with aspects of the present subject matter.

The third gear set 301 represented in FIG. 3 is the same as the first gear set 101 of FIG. 1, except that in the third gear set 301 of FIG. 3, the second shaft W2 is supplemented with a second fixed gear F2.2 and the fifth shaft W5 is supplemented with a fourth idler gear L5.4. In addition, the third gear set 301 has a tenth shift element H. In the engaged condition, the tenth shift element H connects the fourth idler gear L5.4 of the fifth shaft W5 to the fifth shaft W5 in a rotationally fixed manner. The second fixed gear F2.2 of the second shaft W2 and the fourth idler gear L5.4 of the fifth shaft W5 mesh with one another.

For the gear sets 101, 201, 301, a first gear ratio or step is implemented by engaging the second shift element K2, the ninth shift element G, and the fourth shift element B. A second gear ratio is implemented by engaging the first shift element K1 and the fourth shift element B. A third gear ratio is implemented by engaging the second shift element K2 and the sixth shift element D. A fourth gear ratio is implemented by engaging the first shift element K1 and the eighth shift element F. A fifth gear ratio is implemented by engaging the second shift element K2 and the third shift element A. Additionally, a sixth gear ratio is implemented by engaging the first shift element K1 and the fifth shift element C.

Via the sixth shaft W6, a first reverse gear ratio can also be implemented, the torque flow of which extends, starting from the first shaft W1, via the second shaft W2, from there via the sixth shaft W6 to the third shaft W3 and, from there, via the fourth shaft W4 to the drive output. For this purpose, the second shift element K2, the fourth shift element B, the seventh shift element E, and the ninth shift element G are engaged.

A second reverse gear ratio is implemented by engaging the first shift element K1, the fourth shift element B, and the seventh shift element E.

In addition, it is possible to engage a seventh gear ratio. This is implemented by engaging the first shift element K1, the ninth shift element G, and the third shift element A. A torque flow of the seventh gear ratio extends, starting from the first shaft W1, via the third shaft W3, from there via the sixth shaft W6 to the second shaft W2 and, from there, via the fourth shaft W4 to the drive output.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 101 first gear set
103 second gear set
K1 first shift element
K2 second shift element
A third shift element
B fourth shift element
C fifth shift element
D sixth shift element
E seventh shift element
F eighth shift element
G ninth shift element
W1 first shaft
W2 second shaft
F2.1 fixed gear of the second shaft
W3 third shaft
F3.1 first fixed gear of the third shaft
F3.2 second fixed gear of the third shaft
W4 fourth shaft
F4 fixed gear of the fourth shaft
L4.1 first idler gear of the fourth shaft
L4.2 second idler gear of the fourth shaft
L4.3 third idler gear of the fourth shaft
W5 fifth shaft
F5 fixed gear of the fifth shaft
L5.1 first idler gear of the fifth shaft
L5.2 second idler gear of the fifth shaft
L5.3 third idler gear of the fifth shaft
W6 sixth shaft
F6 fixed gear of the sixth shaft
L6 idler gear of the sixth shaft

The invention claimed is:

1. A transmission (101, 201, 301), comprising:
a plurality of shafts comprising a first shaft (W1), a second shaft (W2), a third shaft (W3), a fourth shaft (W4), a fifth shaft (W5), and a sixth shaft (W6);
a plurality of shift elements comprising a first shift element (K1), a second shift element (K2), a third shift element (A), a fourth shift element (B), a fifth shift element (C), a sixth shift element (D), a seventh shift element (E), an eighth shift element (F), and a ninth shift element (G); and a drive output, wherein the first shaft (W1) is connectable to the third shaft (W3) in a rotationally fixed manner via the first shift element (K1), wherein the first shaft (W1) is connectable to the second shaft (W2) in a rotationally fixed manner via the second shift element (K2), wherein the second shaft (W2) is rotationally connectable to the fourth shaft (W4) via the third shift element (A), wherein the third shaft (W3) is rotationally connectable to the fourth shaft (W4) via the fourth shift element (B), wherein the third shaft (W3) is rotationally connectable to the fourth shaft (W4) via the fifth shift element (C), wherein the second shaft (W2) is rotationally connectable to the fifth shaft (W5) via the sixth shift element (D), wherein the fourth shaft (W4) is rotationally connectable to the fifth shaft (W5) via at least the seventh shift element (E), wherein the third shaft (W3) is rotationally connectable to the fifth shaft (W5) via the eighth shift element (F), wherein a fixed gear (F4) of the fourth shaft (W4) and a fixed gear (F5) of the fifth shaft (W5) are both rotationally connected to the drive output, wherein a fixed gear of the second shaft (W2) meshes with a first gearwheel of the sixth shaft (W6), with a first idler gear (L4.1) of the fourth shaft (W4), and a first idler gear (L5.1) of the fifth shaft (W5), wherein a second gearwheel of the sixth shaft (W6) and a fixed gear of the third shaft (W3) mesh, wherein the first gearwheel of the sixth shaft (W6) is an idler gear (L6) and the second gearwheel of the sixth shaft (W6) is a fixed gear (F6), or the first gearwheel of the sixth shaft (W6) is the fixed gear (F6) and the second gearwheel of the sixth shaft (W6) is the idler gear (L6), and wherein the idler gear (L6) of the sixth shaft (W6) is connectable to the sixth shaft (W6) in a rotationally fixed manner via the ninth shift element (G).

2. The transmission (101, 201, 301) of claim 1, wherein the fixed gear of the second shaft (W2) that meshes with the first gearwheel of the sixth shaft (W6), the first idler gear (L4.1) of the fourth shaft (W4), and the first idler gear (L5.1) of the fifth shaft (W5) is a first fixed gear (F2) of the second shaft (W), wherein the first idler gear (L4.1) of the fourth shaft (W4) is connectable to the fourth shaft (W4) in a rotationally fixed manner via the third shift element (A), wherein the first idler gear (L5.1) of the fifth shaft (W5) is connectable to the fifth shaft (W5) in a rotationally fixed manner via the sixth shift element (D), wherein a first fixed gear (F3.1) of the third shaft (W3) is rotationally connected to a second idler gear (L4.2) of the fourth shaft (W4), wherein the second idler gear (L4.2) of the fourth shaft (W4) is connectable to the fourth shaft (W4) in a rotationally fixed manner via the fourth shift element (B), wherein the second idler gear (L4.2) of the fourth shaft (W4) is rotationally connected to a second idler gear (L5.2) of the fifth shaft (W5), wherein the second idler gear (L5.2) of the fifth shaft (W5) is connectable to the fifth shaft (W5) in a rotationally fixed manner via the seventh shift element (E), wherein a second fixed gear (F3.2) of the third shaft (W3) is rotationally connected to a third idler gear (L4.3) of the fourth shaft (W4) and to a third idler gear (L5.3) of the fifth shaft (W5), wherein the third idler gear (L4.3) of the fourth shaft (W4) is connectable to the fourth shaft (W4) in a rotationally fixed manner via the fifth shift element (C), wherein the third idler gear (L5.3) of the fifth shaft (W5) is connectable to the fifth shaft (W5) in a rotationally fixed manner via the eighth shift element (F), and wherein the fixed gear of the third shaft (W3) that meshes with the second gearwheel of the sixth shaft (W6) is the first fixed gear (F3.1) of the third shaft (W3), the second fixed gear (F3.2) of the third shaft (W3), or a third fixed gear of the third shaft (W3).

3. A method for shifting the transmission (101, 201, 301) of claim 1, the method comprising:
   implementing a first gear ratio by engaging the second shift element (K2), the ninth shift element (G), and the fourth shift element (B);
   implementing a second gear ratio by engaging the first shift element (K1) and the fourth shift element (B);
   implementing a third gear ratio by engaging the second shift element (K2) and the sixth shift element (D);
   implementing a fourth gear ratio by engaging the first shift element (K1) and the eighth shift element (F);
   implementing a fifth gear ratio by engaging the second shift element (K2) and the third shift element (A); and
   implementing a sixth gear ratio by engaging the first shift element (K1) and the fifth shift element (C).

4. The method of claim 3, further comprising implementing a reverse gear ratio by engaging the second shift element (K2), the fourth shift element (B), the seventh shift element (E), and the ninth shift element (G).

5. The method of claim 3, further comprising implementing a reverse gear ratio by engaging the first shift element (K1), the fourth shift element (B), and the seventh shift element (E).

* * * * *